(12) United States Patent
Peterson (10) Patent No.: US 9,745,709 B1
(45) Date of Patent: Aug. 29, 2017

(54) MARINE FLOATING DOCKING SYSTEM AND METHOD OF USE

(71) Applicant: John R. Peterson, Tool, TX (US)

(72) Inventor: John R. Peterson, Tool, TX (US)

(*) Notice: Subject to any disclaimer, the term of this patent is extended or adjusted under 35 U.S.C. 154(b) by 0 days.

(21) Appl. No.: 15/207,824

(22) Filed: Jul. 12, 2016

Related U.S. Application Data (60) Provisional application No. 62/215,233, filed on Sep. 8, 2015.

(51) Int. Cl.
*E02B 3/26* (2006.01)
*E02B 3/28* (2006.01)
*E02B 17/00* (2006.01)

(52) U.S. Cl.
CPC .............. *E02B 17/003* (2013.01); *E02B 3/26* (2013.01); *E02B 3/28* (2013.01); *E02B 2017/0056* (2013.01)

(58) Field of Classification Search
CPC ..................................... E02B 3/26; E02B 3/28
USPC ........................ 405/212, 215; 114/219; 14/76
See application file for complete search history.

(56) References Cited

U.S. PATENT DOCUMENTS

| | | | | |
|---|---|---|---|---|
| 2,122,372 A * | 6/1938 | Hooper | ...................... | E02B 3/26 114/219 |
| 3,498,252 A * | 3/1970 | Peacock | ...................... | E02B 3/26 114/219 |
| 3,584,464 A * | 6/1971 | Saadeh | ...................... | E02B 3/26 114/219 |
| 3,593,531 A * | 7/1971 | Saadeh | ...................... | E02B 3/26 114/219 |
| 4,072,022 A * | 2/1978 | Shimizu | ................... | E01D 19/02 114/219 |
| 4,343,258 A * | 8/1982 | Belvedere | ................. | E02B 3/26 114/219 |
| 4,437,793 A * | 3/1984 | Meny | ..................... | E02B 17/003 114/219 |
| 4,877,224 A * | 10/1989 | Watts | ..................... | E01F 15/141 114/219 |
| 5,184,562 A * | 2/1993 | Hallin | ....................... | E02B 3/26 114/219 |
| 5,409,199 A * | 4/1995 | Kahmann | ............... | B29C 33/48 114/220 |
| 5,497,723 A * | 3/1996 | Chase | ....................... | E02B 3/26 114/219 |
| 5,518,342 A * | 5/1996 | Wright | ...................... | E02B 3/26 114/219 |
| 5,562,364 A * | 10/1996 | Darder-Alomar | ........ | E02B 3/26 114/219 |
| 6,095,074 A * | 8/2000 | Reinhardt | ............... | B63B 59/02 114/219 |
| 6,270,387 B1 * | 8/2001 | Nesheim | ............... | E21B 17/012 405/211 |
| 6,389,777 B1 * | 5/2002 | Karlsson | ................. | B66C 1/122 114/219 |
| 7,617,792 B1 * | 11/2009 | Pursley | .................... | E02B 3/26 114/219 |
| 9,453,317 B2 * | 9/2016 | Breedt | ...................... | E02B 3/26 |

(Continued)

*Primary Examiner* — Frederick L Lagman
(74) *Attorney, Agent, or Firm* — Eldredge Law Firm; Richard G. Eldredge (57) ABSTRACT

A floatation device configured to fit around a dock pier. The flotation device includes a body having a first circular section; a second circular section that form a circular opening to receive the dock pier therebetween; and a fastener configured to secure the first circular section to the second circular section.

8 Claims, 6 Drawing Sheets

(56) References Cited

U.S. PATENT DOCUMENTS

| | | | |
|---|---|---|---|
| 2003/0049078 A1* | 3/2003 | Snyder | E02B 3/26 405/212 |
| 2005/0254902 A1* | 11/2005 | Rude | E02B 3/26 405/212 |
| 2014/0270977 A1* | 9/2014 | Goodman | E02B 3/26 405/215 |
| 2016/0060837 A1* | 3/2016 | Breedt | E02B 3/26 405/215 |

* cited by examiner

MARINE FLOATING DOCKING SYSTEM AND METHOD OF USE

BACKGROUND

1. Field of the Invention

The present invention relates generally to marine systems, and more specifically, to a marine docking system for reducing potential damage to watercrafts during docking and/or mooring.

2. Description of Related Art

Figure 1:
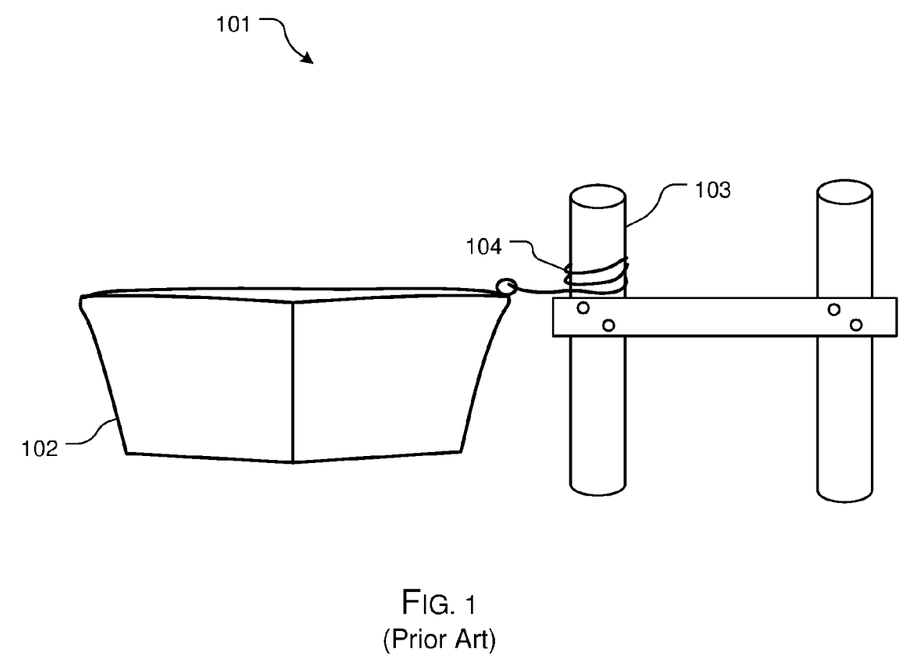
FIG. 1 is a front view of a conventional marine docking system.

Marine docking systems are well known in the art and are effective means to secure a boat to a dock. For example, FIG. 1 depicts a conventional marine docking system 101 which includes a watercraft 102 being secured to a dock pier 103 via a mooring line 104.

One of the problems commonly associated with system 101 is the inherent potential for boat damage. For example, the wave and/or wind motion against the boat could cause the watercraft 102 to collide against the dock, which in turn could cause damage.

Accordingly, there is a need for a mooring system that prevents collision between the boat and the dock.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional marine docking system. Specifically, the present invention reduces the risk of damage to watercrafts and docks, particularly when water level rises or falls. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
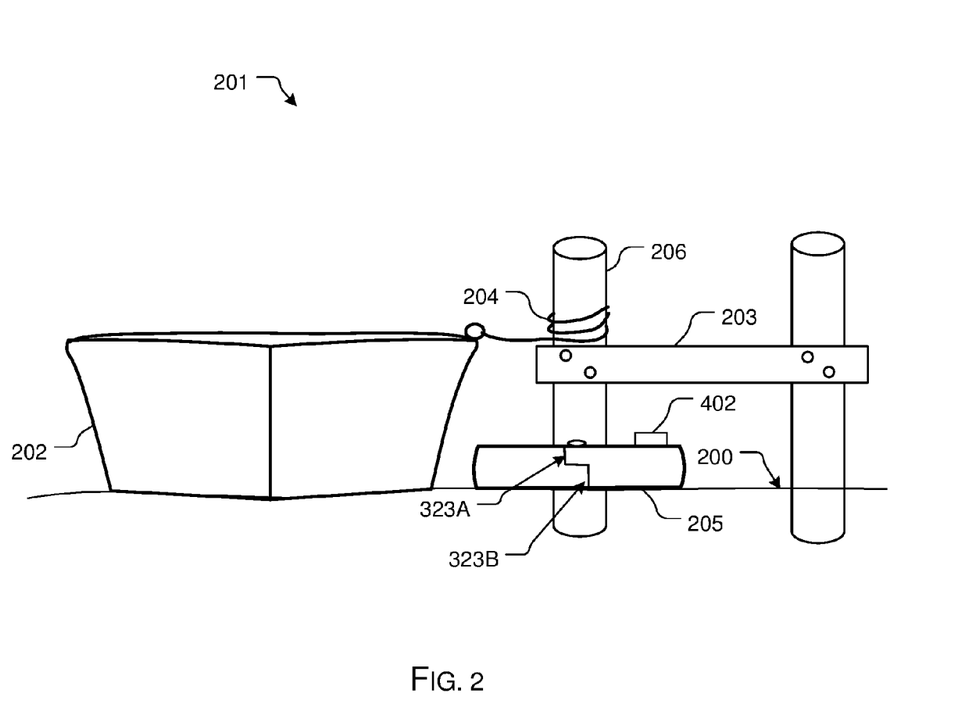
FIG. 2 is a front view of a marine floating docking system in accordance with a preferred embodiment of the present application.

Referring now to the drawings wherein like reference characters identify corresponding or similar elements throughout the several views, FIG. 2 depicts a front view of a marine docking system 201 in accordance with a preferred embodiment of the present application. It will be appreciated that system 201 overcomes one or more of the above-listed problems commonly associated with conventional marine docking systems.

In the contemplated embodiment, system 201 includes a watercraft 202 secured to a pier 206 of dock 203 via a mooring line 204. One of the unique features believed characteristic of the present invention is the use of a bumper 205 configured to wrap around and secure to pier 206. During use, the bumper 205 is utilized to prevent touching of the boat against the pier 206, which in turn reduce damages between the boat and dock. As shown in FIG. 2, the bumper 205 is configured to float on the water surface 200 during use.

Figure 3:
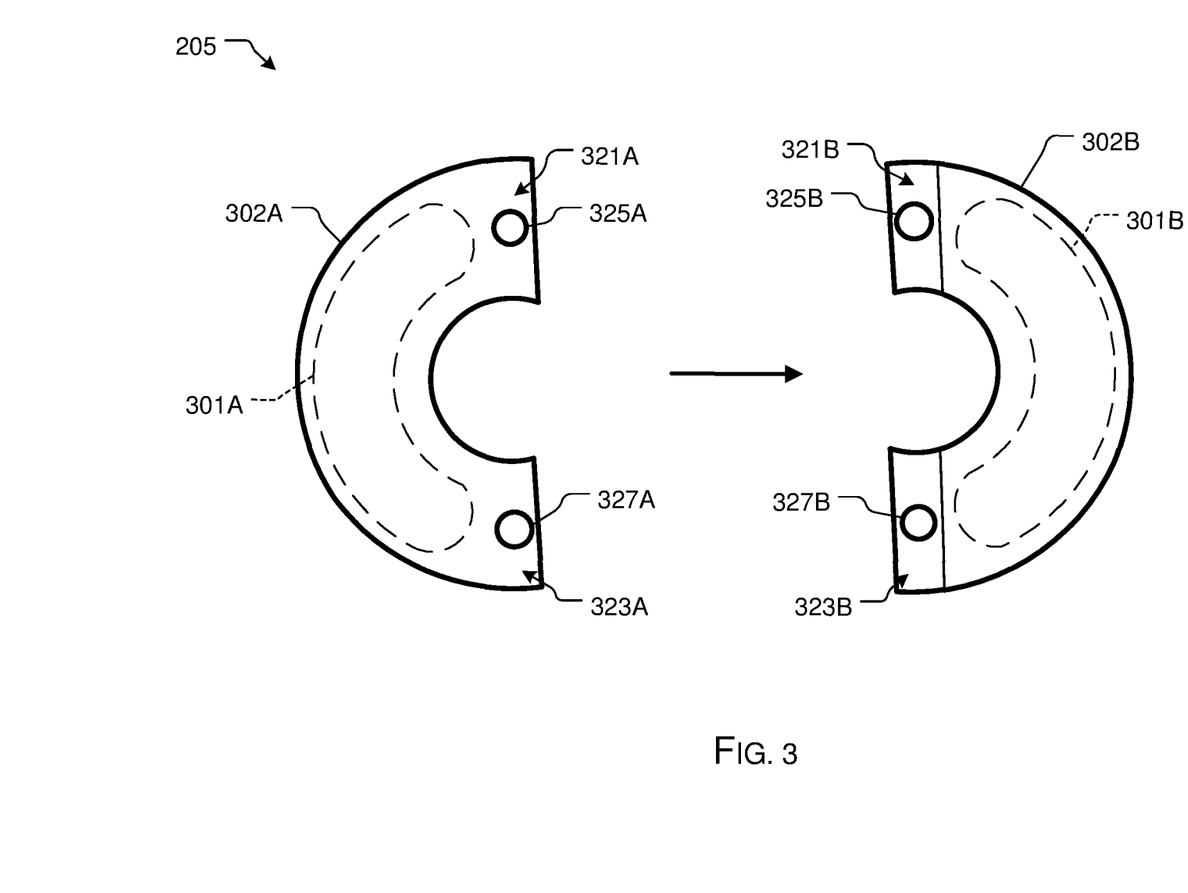
FIG. 3 is a top disassembled view of the bumper of the system of FIG. 2.
Figure 4:
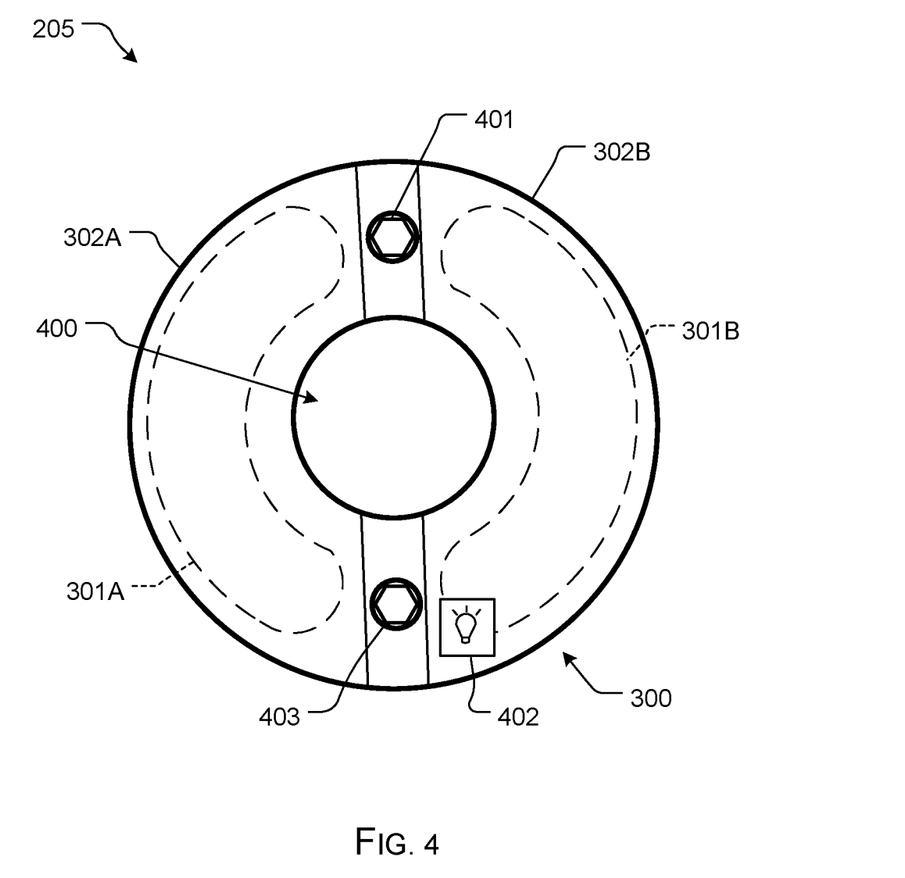
FIG. 4 is a top assembled view of the bumper of FIG. 3.

In FIGS. 3 and 4, top views of the floatation bumper 205 are shown having a housing 300 with two separable sections 302A and 302B. The sections form respective hollow fluidly sealed cavities 301A, 301B which are filled with one or more choices of gases and/or shock absorbent floatation material. Accordingly, the housing is configured to float on the surface 200 of the water during use. It is also contemplated in an alternative embodiment having a housing composed of a solid material that floats on the water surface.

One of the unique features of floatation bumper 205 is the formation of a circular opening 400 formed between sections 302A, 302B and configured to receive the pier of the dock therethrough. This feature allows the floatation bumper 205 to rotate around the pier during use; a feature highly desired in applications wherein the wind and/or water movement causes the boat to move in a direction relatively perpendicular to the elongated length of the dock.

Section 302A includes tabs 321A, 323A that engage with respective tabs 321B, 323B in an interlocking fashion. Holes 325A, 327A extend through respective tabs 321A, 323A and are configured to coaxially align with holes 325B, 327B of respective tabs 321B, 323B. Thereafter, fasteners 401, 403 extend through the holes to secure the sections 302A and 302B together. In one contemplated embodiment, the fastener is a bolt; however, it will be appreciated that alternative embodiments could include other types of fasteners such as quick-release device, snaps, clips, and the like in lieu of the preferred embodiment.

Accordingly, during assembly the sections 302A, 302B are secured around the pier 206 and the tabs of each section are fastened together via the fasteners. The opening 400 allows rotational movement of the bumper relative to the pier and the water tight cavities enable the body to float on the water surface.

It should be appreciated that one of the unique features believed characteristic of the present application is the capability for use of the bumper 205 with docks already in place.

Alternative embodiment of the present application contemplated that the bumper 205 can float, and therefore change vertical positions with the water level, or can be secured at a particular vertical location on the pier through the use of a means such as a clamp attached to the bumper and capable of tightening around a pier. Additional elements may be incorporated into the bumper system such as a light 402 for improved visibility. It is further contemplate that the bumper 205 can vary in size and material as aesthetic, functional, or manufacturing considerations require.

Although shown as a system with to floatation members secured together via a fastener assembly, it will be appreciated that alternative embodiments could include a single flotation member having an opening to receive the post therethrough. Such features are particularly desired in embodiments wherein the dock is being constructed with the system to reduce overall costs, whereas the preferred embodiment is desired when retrofitting existing docks.

Figure 5:
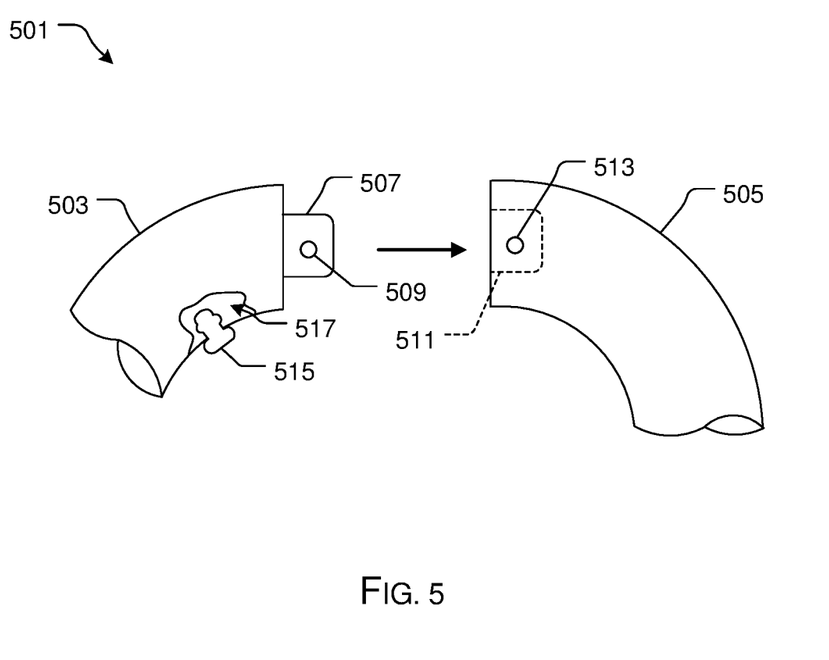
FIG. 5 is a top dissembled top view of a marine floating docking system in accordance with another preferred embodiment of the present application.

Referring now to FIG. 5, an unassembled top view of a system 501 is shown. It will be appreciated that system 501 includes one or more of the features discussed above and incorporates the same. In the exemplary embodiment, the system includes a bumper having a body with two section 503, 505 configured to join each other via a tab 507 having a hole 509 and configured to engage with a slot 511 extending within the body of section 505 and also having a hole 513. When assembled, the holes 509 and 513 are co-axially aligned and a pin is secured therein. The system 501 is further provided with a wear pad 515 configured to extend through the side of the body and engage with an inner cavity 517 of section 503.

Figure 6A:
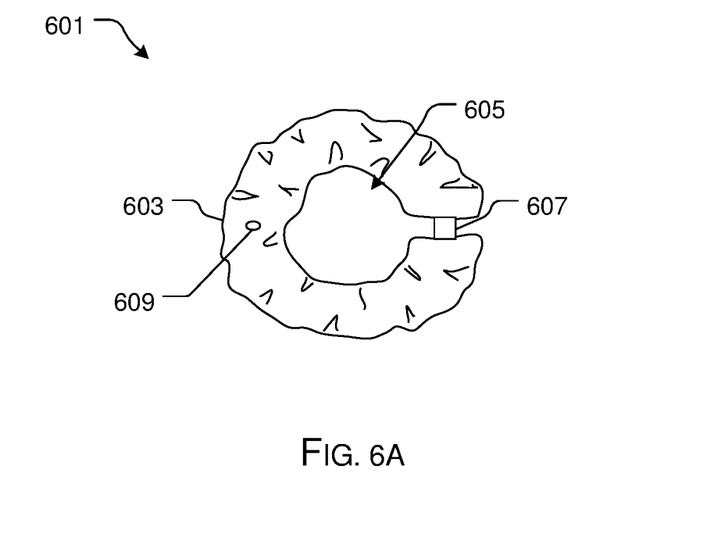
FIG. 6A is a top uninflated to view of a marine floating docking system in accordance with another preferred embodiment of the present application.
Figure 6B:
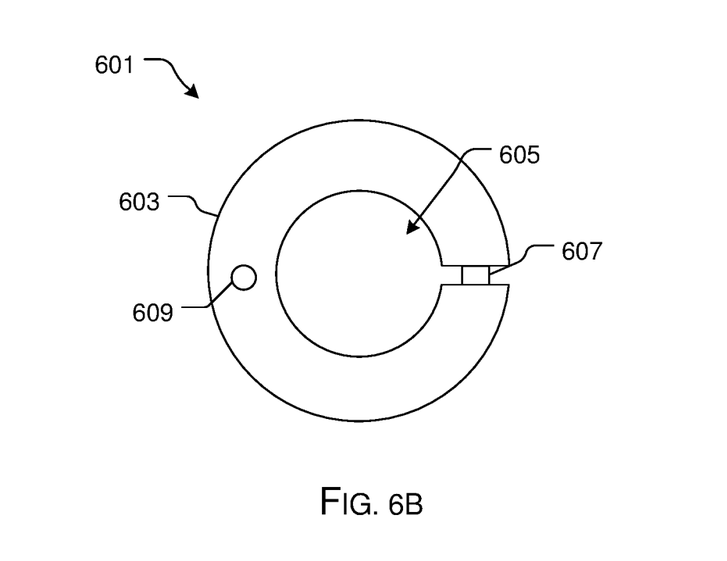
FIG. 6B is a top inflated to view of a marine floating docking system of FIG. 6A.

In FIGS. 6A and 6B, it is further contemplated having a system 601 with an inflatable body 603. It will be appreciated that system 601 includes one or more of the features discussed above. In the exemplary embodiment, the body 603 is composed of an inflatable material and forms a center opening 605 configured to receive the pier post therein. The body 603 is closed in a cylindrical shape via a locking device 607 and is further provided with an optional hole 609 extending through the thickness of the body 603. One of the points of novelty believed characteristic of system 601 is that when uninflated, the body 603 can be wrapped around a piling, pinned, then inflated with gas, thus making a one-piece bumper configuration. It should be understood that the one-piece design, as described above, could not be filled with foam, as it would not be flexible enough to open to accept the piling. According, one reason for the two-piece design is to overcome this problem so that form could be used.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A floatation device configured to fit around a dock pier, the device comprising:
a body having:
a first circular section having a first outer shell forming a first inner cavity configured to hold a first fluidly sealed cavity; and
a second circular section having a second outer shell forming a second inner cavity configured to hold a second fluidly sealed cavity;
wherein the first circular section and the second circular section form a circular opening to receive the dock pier therebetween;
wherein the first fluidly sealed cavity and second fluidly sealed cavity are inflatable with a gas;
a fastener configured to secure the first circular section to the second circular section; and
a removable friction pad extending from the first inner cavity to the circular opening;
wherein the removable friction pad prevents the first outer shell from contacting the dock pier;
wherein the body floats on a water surface;
wherein the body is configured to prevent touching between a boat and the dock pier; and
wherein the circular opening allows the body and the removable friction pad to rotate around the dock pier.

2. The device of claim 1, further comprising:
a first tab extending from a first end of the first circular section;
a second tab extending from a second end of the first circular section;
a third tab extending from a first end of the second circular section; and
a fourth tab extending from a second end of the second circular section;
wherein the first tab is configured to engage with the third tab; and
wherein the third tab is configured to engage with the fourth tab.

3. The device of claim 2, further comprising:
a first hole extending through the first tab and the third tab; and
a second hole extending through the second tab and the fourth tab.

4. The device of claim 3, further comprising:
a first fastener configured to extend through the first hole and secured the first tab to the third tab; and
a second fastener configured to extend through the second hole and secured the second tab to the fourth tab.

5. The device of claim 4, wherein the first fastener is a bolt.

6. The device of claim 1, further comprising:
a light secured to a top surface of the body.

7. A method to prevent touching between a boat and a dock, comprising:
providing the flotation device of claim 1;
securing the flotation device to the dock.

8. The method of claim 7, further comprising:
allowing rotational movement of the flotation device via the opening formed between the first section and the second section.

* * * * *